(12) United States Patent
McGuire

(10) Patent No.: US 6,361,325 B1
(45) Date of Patent: Mar. 26, 2002

(54) CHILDREN'S SLEEPTIME TIMER AND CLOCK DEVICE

(76) Inventor: Patricia E. McGuire, 19 Stonehouse Dr., Whitehouse Station, NJ (US) 08889

( * ) Notice: Subject to any disclaimer, the term of this patent is extended or adjusted under 35 U.S.C. 154(b) by 0 days.

(21) Appl. No.: 09/711,255

(22) Filed: Nov. 13, 2000

(51) Int. Cl.[7] .............................................. G09B 19/12
(52) U.S. Cl. ........................ 434/304; 368/45; 368/71; 368/77
(58) Field of Search ..................... 434/304; 368/1–327; 446/147–152, 236–266

(56) References Cited

U.S. PATENT DOCUMENTS

| | | | |
|---|---|---|---|
| 372,074 A | * 10/1887 | Kuhn | |
| 2,305,283 A | * 12/1942 | Theilkas | |
| 3,747,330 A | 7/1973 | Tupone | ........................ 368/221 |
| 4,759,002 A | * 7/1988 | Cash | |
| 4,799,890 A | * 1/1989 | Thompson | |
| 5,044,961 A | 9/1991 | Bruskewitz | ................. 434/304 |
| 5,505,624 A | 4/1996 | Novosel | |
| 5,568,452 A | * 10/1996 | Kronenberg | |
| 5,851,118 A | * 12/1998 | Woldenberg | |
| 5,863,205 A | * 1/1999 | Martens | |
| 5,872,746 A | 2/1999 | Reiner | ......................... 368/223 |
| 6,030,228 A | * 2/2000 | Armstrong | |
| 6,071,124 A | * 6/2000 | Ang | |

* cited by examiner

Primary Examiner—Jacob K. Ackun, Jr.
Assistant Examiner—Dmitry Suhol
(74) Attorney, Agent, or Firm—Kenneth P. Glynn, Esq.

(57) ABSTRACT

The present invention is children's sleeptime timer and clock device. It includes a housing which contains and displays a clock, such as a digital clock, and/or an analog clock, and contains a sleeptime display timer. The sleeptime display timer contained within the housing includes a display wheel having at least two illustrations wherein when a first illustration is openly displayed at least a second illustration is hidden from view and vice versa and wherein at least the first illustration relates to a child's sleeptime. There is also a step-up drive mechanism connected to the display wheel and adapted to maintain the display wheel in a first position and then shift it to a second position and vice versa, at predetermined times. There is also a timing mechanism to operate the set-up drive mechanism at the first and second predetermined times to rotate the display wheel, as well as a setting mechanism to permit setting of the first and the second predetermined times.

20 Claims, 2 Drawing Sheets

CHILDREN'S SLEEPTIME TIMER AND CLOCK DEVICE

BACKGROUND OF THE INVENTION

1. Field of the Invention

The present invention is directed to a device for parents to make the transition from awake time to bedtime more efficient and reliable for young children. More specifically, it includes a clock and a timer wherein the timer causes movement of a display wheel for presentation of a sleeptime-related illustration at an appropriate time to motivate the child to go to bed in the evening. Likewise, the device also guides the child to stay in bed or rise in the morning, depending upon the illustration presented.

2. Information Disclosure Statement

The following patents related to time pieces and other devices which involve activity timing, or the like:

U.S. Pat. No. 3,747,330 describes a time piece having animated motion resulting from an annular member mounted slidably around an eccentrically rotatable wheel, the eccentrically mounted wheel being mounted on a shaft rotatable by a time mechanism at a rate of one rotation per minute. In a preferred embodiment, there is a rotatable transparent disk concentrically mounted on a shaft and rotatable by the shaft at a rate of one rotation per minute, the transparent disk having thereon an animate-appearing object.

U.S. Pat. No. 4,759,002 describes a clock having a housing which contains two internal disks and a motor for rotation of those disks on a shaft. An hour disk is provided having a shaded region representing night and an unshaded region representing day. The hour disk is positioned to appear through an opening in the clock face. The face of the clock may have one or more openings to expose the minute and hour disks. One of the openings has a numerical representation of hours provided on the clock face there around. The clock is arranged so the line separating the dark and light regions of the hour disk indicates the hour of day by pointing to a number on the face, and also graphically represents the amount of time from and to the previous and next sunrise or sunset.

U.S. Pat. No. 5,044,961 describes a timer for teaching young children the concept of time. The timer includes a timing mechanism contained within a housing having a timer dial and activity selector. The timer dial permits selection of a duration of predetermined length and includes an indicator which moves in relation to a time scale to graphically illustrate the change in duration of length. The activity selector permits display of a graphic representation of the activity being timed or for which the child is waiting.

U.S. Pat. No. 5,872,746 describes, a clock timer. A clock timer having a face compromising a mouth, eyes, a nose, and an arm secured to the nose. Rotation of the nose turns the shaft which, via a camming mechanism, forces a plate housed within the clock upward. As the plate moves upward, a rack formed in the plate drives a gear mechanism which rotates the mouth and eyes from a smiling orientation to a frowning orientation. Rotation of the shaft also rotates a timer housed within the clock. Upon expiration of the timer the shaft is rotated in the opposite direction, thereby lowering the plate, driving the gear mechanism, and rotating the mouth and eyes from their frowning orientation to their smiling orientation, and activating a bell housed in the timer.

Notwithstanding the prior art, the present invention is neither taught nor rendered obvious thereby.

SUMMARY OF THE INVENTION

The present invention is a children's sleeptime timer and clock device, It includes: (a) a housing adapted to contain and display at least one clock and to contain (b) at least one clock; and, (c) a sleeptime display timer contained within the housing, which contains: (i) a display wheel having at least two illustrations wherein, when a first illustration is openly displayed, at least a second illustration is hidden from view, and, when the second illustration is openly displayed, at least the first illustration is hidden from view, and wherein the first illustration relates to a child's sleeptime; (ii) a step-up drive mechanism connected to the display wheel and adapted to maintain the display wheel in a first position such that the first illustration is hidden from view for a predetermined time during daytime and is adapted to move said display wheel to a second position to openly display the first illustration to signal to a child that it is bedtime, and to return the first illustration to a hidden position at a second predetermined time to signal to a child that it is time to be out of bed; (iii) timing means to operate the step-up device mechanism at the first and second predetermined times to rotate the display wheel; and, (iv) setting means adapted to permit setting of the first and second predetermined times.

By "step-up drive mechanism" as used herein is meant a motor drive that turns on and off in response to signals to drive the display from one position to another position. It is not a continuous drive mechanism and the display wheel of the present invention is not intended to rotate continuously.

In the present invention children's sleeptime timer and clock device either an analog or a digital clock, or both may be employed. The timing means of the sleeptime display timer may include a programmable chip and the setting means may be an input pad. Alternatively, other setting means may be employed in the present invention device. For example, the type of timers used to turn lights on and off may be employed. Thus, the timing means may be a set of manually rotatable on/off bars located about a rotating clock mechanism for setting and triggering the timer.

The present invention children's sleeptime timer and clock device housing may include a half circle opening for display of a portion of a display wheel, or some other appropriate shape. In one preferred embodiment, the display wheel is graphically divided into two halves and contains the first illustration on a first half and contains the second illustration on a second half. In other embodiments, the display wheel has three illustrations. For example, there may be a number of illustrations on said display wheel and the illustrations are located on equal pie shaped areas of the display wheel. Here the housing may include a pie shaped opening at least equal to the pie shaped areas.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Dr. Richard Ferber, Director of the Center for Pediatric Sleep Disorders at Children's Hospital in Boston, Mass., emphasizes the importance of bedtime routines for children. He notes that, as a baby grows into childhood, the routines at bedtime continue to be important. If bedtime is a pleasant time, a child will look forward to this part of the day instead of becoming fussy when it is time for sleep. Bedtime rituals differ, of course, and parents should choose a routine that suits the family, but should make sure enough time is allocated to spend with the child each night. Following the routine as consistently as one can is extremely important. The child should know when he has to change into his pajamas, brush his teeth, and go to bed. He should know what bedtime activities are planned and how much time will be spent on them.

Bedtime means separation, which is difficult for children, especially very young ones. Simply sending a toddler or young child off to bed alone is not appropriate or fair and may be scary for him. And it means that the parent will miss what can be one of the best times of the day. So Dr. Ferber suggests that parents set said aside ten to thirty minutes to do something special with their child before bed. Avoid teasing, scary stories, or anything that will excite the child at this time. He recommends utilizing pre-bedtime for discussion, quiet play, or story reading, and then letting the child know that the special time together will not extend beyond the time set for lights out, and not to give in for an extra story. The child will learn the rules only if the parent enforces them. If both the parent and the child know just what is going to happen, there won't be the arguments and tension that would otherwise arise when there is uncertainty. The present invention is directed to further assist parents by enabling them to make a smooth, consistent transition from awake time to bedtime. It also aids in keeping a child in bed when the child wakes up early and to visually inform the child that its time to be up.

Figure 1:
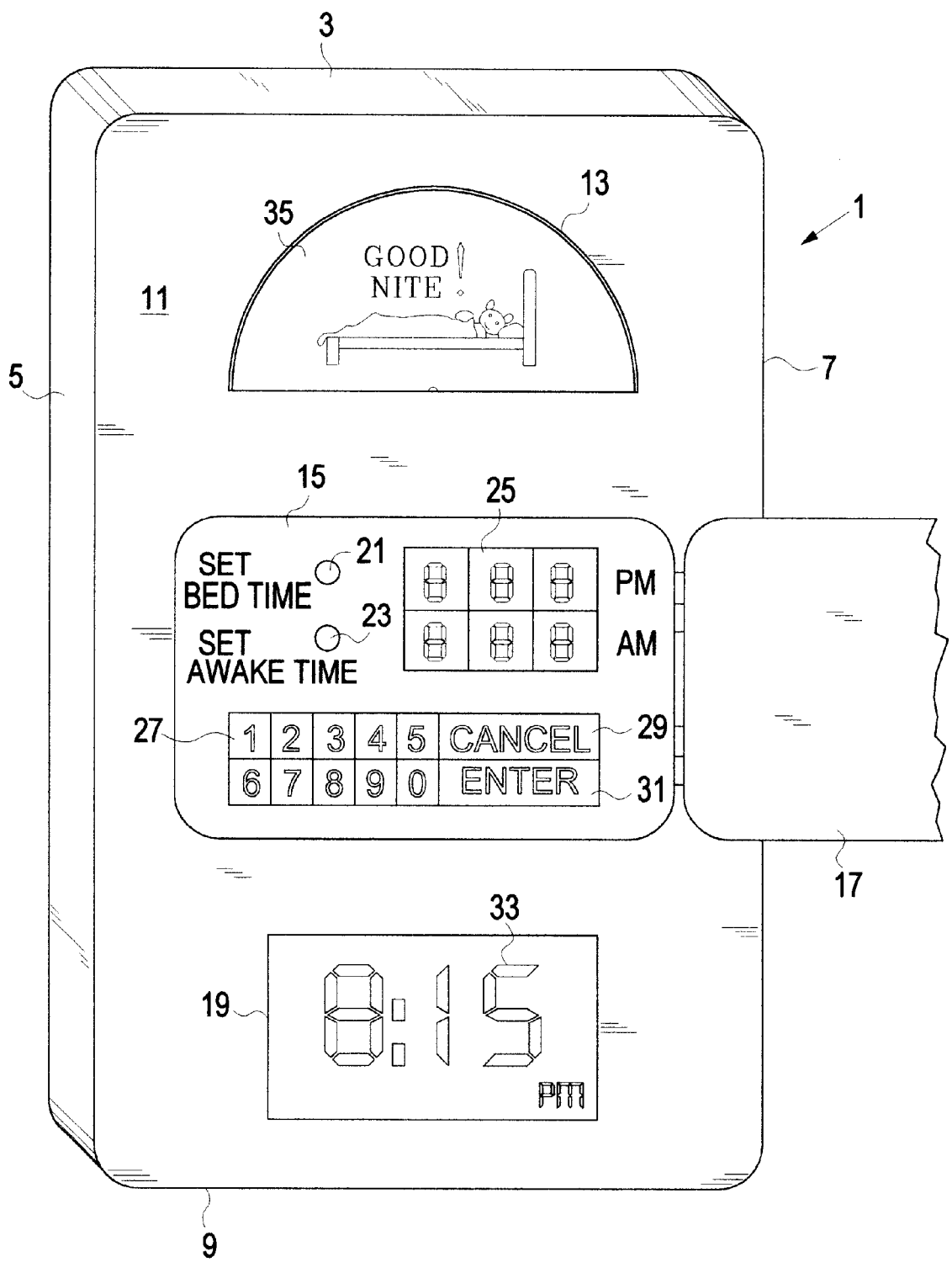
FIG. 1 illustrates a front perspective view of one embodiment of the present invention children's sleeptime timer and clock device, wherein an electronic timer is included.

Referring now to FIG. 1, there is shown a present invention device 1 which includes a top 3, a left side 5, a right side 7, a bottom 9, a front 11, and a back not shown. Front 11, includes a window 13 which presents a display wheel 35. Display wheel 35 is a half circle illustration showing a sleeptime scene and it includes a lower half with a different second illustration showing an awake scene. Electronic timer 15 is used to set the bedtime and the awake time using set buttons 21 and 23, respectively, and then using keypad 27. For example, a user could press button 21 for setting bedtime, enter 800 into keypad 27, press enter button 31 and 8:00 P.M. will appear on display 25. Next, the user can press button 23 for setting the awake time and then, for example, entering 730 into keypad 27 and pressing enter 31 button. The lower numerals on display 25 will appear as 7:30 A.M. Thus timer 15 drives a step-up mechanism which, through motor drive and gearing, rotates the display wheel ½ turn at the present bedtime and again at the reset awake time to visually inform the child that he or she should be asleep or up and around. The timer also includes a chip for receiving, storing and activating the timing data and signals. Door 17 may then be closed and may optionally include a decorative illustration. Digital clock 19 will display time 33 to enable a parent to teach time to the child. Digital clock 19 may be connected to the timer 15 for synchronization or may operate separately. The device may be operated by house current, battery or otherwise. The foregoing could alternatively be modified to accommodate a plurality of sleeptime and awake time inputs for a single 24 hour cycle. For example, with the display wheel having only 2 illustrations, such a modified device could be programmed to accommodate two or three sleep and awake cycles, thereby accommodating one or two naps in addition to nighttime sleep.

Figure 2:
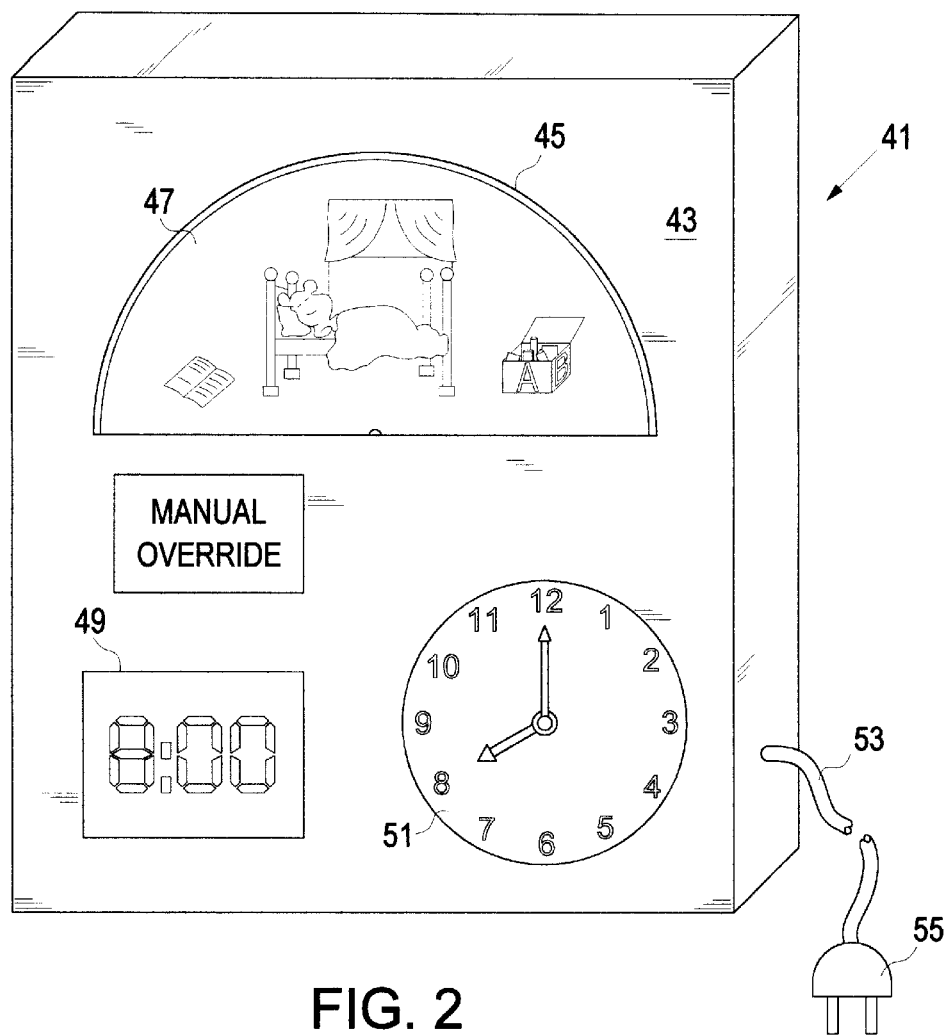
FIG. 2 illustrates a front perspective view of another embodiment of the present invention children's sleeptime timer and clock device containing both a digital and an analog clock.

FIG. 2 illustrates children's sleeptime timer and clock devise of the present invention. Here, device 41 has a main housing with a front 43 which includes a half circle opening 45 for displaying a first illustration or a second illustration of display wheel 47, depending on which half is positioned in the opening 45.

Clock 49 is a digital clock and clock 51 is an analog clock. These enable a parent to teach children time on both types of clocks, as well as to relate bedtime and awake time to a specific time. Device 41 may be operated by house current with cord 53 and plug 55. The timing may be set for the step-up.

The timing 13 is set by a timer (not shown) for device 41 and this may be located in the back of device 41 and could be similar to timer 15 of FIG. 1. Alternatively, the type of timers used on lighting such as timer 61 shown in FIG. 3 could be used. In this case, clock disk 63 is used to locate time by rotation of dark arrow 65 and light arrow 67 wherein the user simply positions the arrows at the desired times for rotation of the display wheel, using arrow 65 for sleeptime illustration display and arrow 67 for awake time illustration display.

Figures 3, 4:
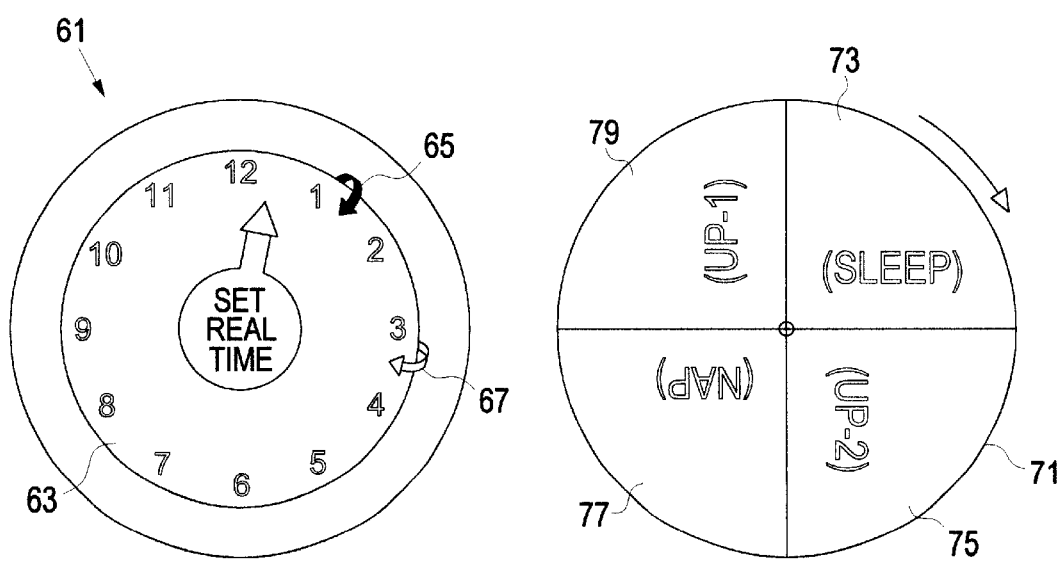
FIG. 3 illustrates an alternative timer mechanism which may be used in the present invention devices; and, FIG. 4 illustrates an alternative embodiment display wheel which may be used in the present invention devices.

FIG. 4 shows an alternative embodiment display wheel 71 using four quadrants. The words in parenthesis in quadrants 73, 75, 77 and 79 would actually be pictorial illustrations. This wheel 71 could be used in a device having a main housing with a pie-shaped window to display only one quadrant at a time. Also, although the quadrants are equal in size, they generally would not be displayed for equal periods of time. For example, the sleep quadrant 73 could be present to "pop-up" at 7:00 P.M., the up-1 quadrant 75 at 7:30 A.M., the nap quadrant 77 at 1:30 P.M. and the up-2 quadrant 79 at 3:30 P.M.. Other combinations could be used and yet be within the scope of the present invention.

Obviously, numerous modifications and variations of the present invention are possible in light of the above teachings. It is therefore understood that within the scope of the appended claims, the invention may be practiced otherwise than as specifically described herein.

What is claimed is:

1. A children's sleeptime timer and clock device, which comprises:
   (a) a housing adapted to contain and display a digital clock, an analog clock and to contain a sleeptime display timer;
   (b) a digital clock contained within said housing to digitally display at least hours and minutes;
   (c) an analog clock contained within said housing and having at least an hour hand and a minutes hand;
   (d) a sleeptime display timer contained within said housing, which contains:
      (i) a display wheel having at least two illustrations wherein, when a first illustration is openly displayed, at least a second illustration is hidden from view, and, when said second illustration is openly displayed, at least said first illustration is hidden from view, and wherein said first illustration relates to a child's sleeptime;
      (ii) a step-up drive mechanism connected to said display wheel and adapted to maintain said display wheel in a first position such that said first illustration is hidden from view for a predetermined time during daytime and is adapted to move said display wheel to a second position to openly display said first illustration to signal to a child that it is bedtime, and to return said first illustration to a hidden position at a second predetermined time to signal to a child that it is time to be out of bed;

(iii) timing means to operate said step-up drive mechanism at said first and second predetermined times to rotate said display wheel; and, (iv) setting means adapted to permit setting of said first and second predetermined times.

2. The children's sleeptime timer and clock device of claim 1 wherein said timing means of said sleeptime display timer includes a programmable chip and said setting means is an input pad.

3. The children's sleeptime timer and clock device of claim 1 wherein said timing means is a rotating clock mechanism and said setting means is a set of manually rotatable switch bars located about said clock mechanism for setting and triggering said timer.

4. The children's sleeptime timer and clock device of claim 1 wherein said housing includes a half circle opening for display of a portion of said display wheel.

5. The children's sleeptime timer and clock device of claim 4 wherein said display wheel is graphically divided into two halves and contains said first illustration on a first half and contains said second illustration on a second half.

6. The children's sleeptime timer and clock device of claim 1 wherein there are at least three illustrations on said display wheel, and at least one illustration relates to a non-sleeptime child's event.

7. The children's sleeptime timer and clock device of claim 6 wherein there are a number of illustrations on said display wheel and said illustrations are located on equal pie shaped areas of said display wheel.

8. The children's sleeptime timer and clock device of claim 6 wherein said housing includes a pie shaped opening at least equal to said pie shaped areas.

9. The children's sleeptime timer and clock device of claim 8 wherein said timing means of said sleeptime display timer includes a programmable chip and said setting means is an input pad.

10. The children's sleeptime timer and clock device of claim 8 wherein said timing means is a rotating clock mechanism and said setting means is a set of manually rotatable switch bars located about said clock mechanism for setting and triggering said timer.

11. A children's sleeptime timer and clock device, which comprises:

(a) a housing adapted to contain and display at least one clock, and a to contain a sleeptime display timer;

(b) a clock contained within said housing to display at least hours and minutes;

(c) a sleeptime display timer contained within said housing, which contains:

(i) a display wheel having at least two illustrations wherein, when a first illustration is openly displayed, at least a second illustration is hidden from view, and, when said second illustration is openly displayed, at least said first illustration is hidden from view, and wherein said first illustration relates to a child's sleeptime;

(ii) a step-up drive mechanism connected to said display wheel and adapted to maintain said display wheel in a first position such that said first illustration is hidden from view for a predetermined time during daytime and is adapted to move said display wheel to a second position to openly display said first illustration to signal to a child that it is bedtime, and to return said first illustration to a hidden position at a second predetermined time to signal to a child that it is time to be out of bed;

(iii) timing means to operate said step-up drive mechanism at said first and second predetermined times to rotate said display wheel; and, (iv) setting means adapted to permit setting of said first and second predetermined times.

12. The children's sleeptime timer and clock device of claim 11 wherein said timing means of said sleeptime display timer includes a programmable chip and said setting means is an input pad.

13. The children's sleeptime and clock device of claim 11 wherein said timing means is a rotating clock mechanism and said setting means is a set of manually rotatable switch bars located about said clock mechanism for setting and triggering said timer.

14. The children's sleeptime and clock device of claim 11 wherein said housing includes a half circle opening for display of a portion of said display wheel.

15. The children's sleeptime and clock device of claim 14 wherein said display wheel is graphically divided into two halves and contains said first illustration on a first half and contains said second illustration on a second half.

16. The children's sleeptime and clock device of claim 11 wherein there are at least three illustrations, on said display wheel, and at least one illustration relates to a non-sleeptime child's event.

17. The children's sleeptime and clock device of claim 16 wherein there are a number of illustrations on said display wheel and said illustrations are located on equal pie shaped areas of said display wheel.

18. The children's sleeptime timer and clock device of claim 16 wherein said housing includes a pie shaped opening at least equal to said pie shaped areas.

19. The children's sleeptime timer and clock devise of claim 11 wherein said at least one clock includes a digital clock.

20. The children's sleeptime timer and clock devise of claim 11 wherein said at least one clock includes an analog clock.

* * * * *